(12) United States Patent
Donohue et al.

(10) Patent No.: US 7,844,564 B2
(45) Date of Patent: *Nov. 30, 2010

(54) SYSTEM AND METHOD OF LOAD BALANCING USING FUZZY LOGIC

(75) Inventors: Elizabeth A. Donohue, Providence, RI (US); Michael P. Outlaw, Dallas, GA (US); Ken A. Sohal, Suwanee, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/419,622

(22) Filed: Apr. 7, 2009

(65) Prior Publication Data

US 2009/0276388 A1    Nov. 5, 2009

Related U.S. Application Data

(63) Continuation of application No. 11/621,411, filed on Jan. 9, 2007, now Pat. No. 7,577,635.

(51) Int. Cl.
*G06F 9/44* (2006.01)
*G06N 7/02* (2006.01)
*G06N 7/06* (2006.01)

(52) U.S. Cl. ..................................................... 706/52
(58) Field of Classification Search .................. 706/52
See application file for complete search history.

(56) References Cited

U.S. PATENT DOCUMENTS

| | | | |
|---|---|---|---|
| 6,792,275 B1 | 9/2004 | Lo et al. |
| 6,922,689 B2 | 7/2005 | Shtivelman |
| 7,007,035 B2 | 2/2006 | Kamath et al. |
| 7,023,979 B1 | 4/2006 | Wu et al. |
| 7,103,580 B1 | 9/2006 | Batachia et al. |
| 7,170,993 B2 | 1/2007 | Anderson et al. |
| 7,191,329 B2 | 3/2007 | Murphy |
| 7,212,490 B1 | 5/2007 | Kao et al. |
| 7,257,563 B2 | 8/2007 | Shmulevich et al. |

(Continued)

OTHER PUBLICATIONS

Project Knowledge Management Organizational Design and Success Factors—An Empirical Study in Germany, Frey, P.; Lindner, F.; Muller, A.; Wald, A.; System Sciences, 2009. HICSS '09. 42nd Hawaii International Conference on Digital Object Identifier: 10.1109/HICSS.2009.356 Publication Year: 2009 , pp. 1-14.*

(Continued)

*Primary Examiner*—Michael Holmes
(74) *Attorney, Agent, or Firm*—Anna Linne; Roberts Mlotkowski Safran & Cole, P.C.

(57) ABSTRACT

A system and method of load balancing using fuzzy logic and, more particularly, to a system and method of load balancing tasks over a grid environment including, for example, CPU utilization, traffic over a network and other functions. The method comprises defining cause and effect relations associated with input variables and output variables. A current utilization is assessed. The method further includes determining which cause and effect relations are associated with the current utilization and calculating a weighted balancing factor for the cause and effect relations having membership with the utilization. A load is balanced using the weighted balancing factor.

25 Claims, 5 Drawing Sheets

U.S. PATENT DOCUMENTS

| | | | |
|---|---|---|---|
| 7,287,016 | B2 | 10/2007 | Johnson et al. |
| 7,308,687 | B2 | 12/2007 | Trossman et al. |
| 7,343,364 | B2 | 3/2008 | Bram et al. |
| 7,418,470 | B2 | 8/2008 | Howard et al. |
| 7,447,614 | B2 | 11/2008 | Ghaboussi et al. |
| 7,577,635 | B2 * | 8/2009 | Donohue et al. ............. 706/52 |
| 2002/0133532 | A1 | 9/2002 | Hossain |
| 2004/0047289 | A1 | 3/2004 | Azami et al. |
| 2004/0114569 | A1 | 6/2004 | Nadem et al. |
| 2004/0210903 | A1 | 10/2004 | Kosanovic et al. |
| 2005/0091657 | A1 | 4/2005 | Priem |

OTHER PUBLICATIONS

Interconnected des models of emergency, outpatient, and inpatient departments of a hospital, Gunal, M.M.; Pidd, M.; Simulation Conference, 2007 Winter Digital Object Identifier: 10.1109/WSC.2007.4419757 Publication Year: 2007, pp. 1461-1466.*

Building an effective ERP selection system for the technology industry, Shuai, J.J.; Kao, C.Y.; Industrial Engineering and Engineering Management, 2008. IEEM 2008. IEEE International Conference on Digital Object Identifier: 10.1109/IEEM.2008.4738018 Publication Year: 2008, pp. 989-993.*

Integrating Decision Trees and Cognitive Maps for Market Segmentation in Service Sector, Sadic, S.; Kayakutlu, G.; Management of Engineering and Technology, Portland International Center for Digital Object Identifier: 10.1109/PICMET.2007.4349612 Publication Year: 2007, pp. 2748-2754.*

"A geometric approach for three-phase load balancing in distribution networks", Kashem, M.A.; Ganapathy, V.; Jasmon, G.B.; Power System Technology, 2000. Proceedings. PowerCon 2000. International Conference on vol. 1, Dec. 4-7, 2000, pp. 293-298, vol. 1, Digital Object Identifier 10.1109/ICPST.2000.900072.

"Dynamic load balancing of iterative data parallel problems on a workstation cluster", Hye-Seon Maeng; Hyoun-Su Lee; Tack-Don Han; Sung-Bong Yang; Shin-Dug Kim; High Performance Computing on the Information Superhighway, 1997. HPC Asia '97, Apr. 28-May 2, 1997, pp. 563-567, Digital Object Identifier, 10.1109/HPC.1997.592209.

"Load balancing and switch scheduling", Xiangheng Liu; Goldsmith, A.; Communications, 2005. ICC 2005. 2005 IEEE International Conference on vol. 2, May 16-20, 2005, pp. 1010-1014, vol. 2, Digital Object Identifier 10.1109/ICC.2005.1494501.

"A Framework of Using Mobile Agent to Achieve Efficient Load Balancing in Cluster", Cho Cho Myint; Khin Mar Lar Tun; Information and Telecommunication Technologies, 2005. APSITT 2005 Proceedings. 6$^{th}$ Asia-Pacific Symposium on 10-10 Nov. 2005, pp. 66-70, Digital Object Identifier 10.1109/APSITT.2005.203632.

* cited by examiner

SYSTEM AND METHOD OF LOAD BALANCING USING FUZZY LOGIC

CROSS REFERENCE TO RELATED APPLICATIONS

The present application is a continuation application of application Ser. No. 11/621,411, filed on Jan. 9, 2007, the contents of which are hereby incorporated by reference in their entirety.

FIELD OF THE INVENTION

The invention generally relates to a system and method of load balancing using fuzzy logic and, more particularly, to a system and method of load balancing tasks over a grid environment including, for example, CPU utilization, traffic over a network and other functions.

BACKGROUND OF THE INVENTION

Load balancing of resources is critical to the success of a grid environment, as well as other environments such as traffic over a network. Load balancing may take into account different considerations such as, for example, computer processing speed of a single computer or over an entire grid, available memory, I/O bound processes, the tasks that are running on the grid, etc. Usually the aim of load-balancing is to move the running tasks across the computer processing units in order to insure that no processor is idle or overworked during run time. Said otherwise, load balancing seeks to optimally balance the load over an entire grid. In theory, load balancing should minimize the total running time by a set of tasks.

Load balancing may be accomplished by several different methods. For example, to combat overload, a predefined threshold may simply be defined per application. In this type of approach, a load test is performed in a test-lab using a number of parallel sessions, maximal number of waiting events in the queue or more generic resources like CPU or memory use. New incoming loads will simply be rejected when they exceed the threshold.

Another methodology is to add a load balancer to tailor the incoming load between a given set of processors. This methodology avoids the rejection of new incoming loads, but it does not typically solve overload conditions for a single processor.

Another methodology is to use a grid scheduler. The grid scheduler can be used to determine the amount of workload to schedule across a cluster of computers. However, improper scheduling results in poor performance of the grid, itself.

Schedulers commonly use classical methods for distributing work load across the grid. Best-fit algorithms and the like, for example, are often used when a job size can be predicted. In an example of a best-fit scheduler, the scheduler attempts to find the best time slot to load/place a particular known job. In this approach, the jobs try to make reservations on the grid based on priority.

In another example, supercluster job reservation systems use a full reservation system where jobs are submitted to a central queue. The reservation system locates resources from one or more clusters and reserves the exact resources required by the job. Job prediction is important in this model and thus requires profiling information on the job itself. This profiling may include, for example, resources needed, possibly expected run time, or I/O needed for a particular job.

Other grid based systems use more basic scheduling policies, like round robin approaches. In such approaches, the jobs are disbursed without account of the load on the systems in the grid. In the round robin approach, the grid components may have more available resources than the job is using and thus resources are not utilized to their maximum efficiency.

In any of the above scenarios, difficulties may arise from the practicalities of a load distribution mechanism as well as restrictions imposed by real time constraints of the grid. Thus, to maintain the process mix of a grid requires an instantaneous and free redistribution of all processes in the system.

Accordingly, there exists a need in the art to overcome the deficiencies and limitations described hereinabove.

SUMMARY OF THE INVENTION

In a first aspect of the invention, a method comprises defining cause and effect relations associated with input variables and output variables. A current utilization is assessed. The method further includes determining which cause and effect relations are associated with the current utilization and calculating a weighted balancing factor for the cause and effect relations having membership with the utilization. A load is balanced using the weighted balancing factor.

In another aspect of the invention, a method for deploying an application for balancing loads in a computing environment comprises providing a computer infrastructure operable to assess a current utilization and determine input and output relations belonging with a membership with the current utilization. The input and output relations are imprecisely defined by ranges. The computer infrastructure is operable to calculate a weighted balancing factor for the input and output relations having membership with the utilization. The computer infrastructure is operable to balance a load using the weighted balancing factor.

In another aspect of the invention, a system comprising a server has a database containing data associated with overlapping ranges of input variables and overlapping ranges of output variables. At least one of a hardware and software component calculates a weighted balancing factor by balancing areas of adjusted overlapping ranges of the output variables. The weighted balancing factor is applied to a current utilization to adjust the current utilization to a predefined optimal performance.

In another aspect of the invention, a computer program product comprising a computer usable medium having readable program code embodied in the medium is provided. The computer program product includes at least one component to perform the steps of the invention.

DETAILED DESCRIPTION OF EMBODIMENTS OF THE INVENTION

The invention generally relates to a system and method of load balancing using fuzzy logic and, more particularly, to system and method of load balancing tasks over a grid environment including, for example, optimizing CPU utilization, traffic over a network and other functions. The invention can be implemented over any distributed network or stand-alone server, for example. By using the invention, it is possible to efficiency and continuously balance loads over a grid environment.

In implementation, the system and method uses fuzzy logic on computer elements themselves. This is made possible with processor feedback, packet profiling, and/or I/O monitoring of complex load balancing. The fuzzy logic implemented by the system and method of the invention takes information that is not precisely defined and creates a definable precise appearing value for implementing a load-balancing scheme. By way of one non-limiting illustration, the system and method of the invention takes packet sizes, grid jobs, and processor usage that are not precisely defined sets and, using such information, creates a "crisp" (well defined) output for these values. In turn, the "crisp" output of these values is utilized to create a precise control and balance in a network or grid environment.

In an embodiment, the system and method uses scheduling as a function of load control to augment the balancing which, in turn, will maximize resources and job output. The scheduling controls the rate at which jobs are disbursed to nodes within the grid or traffic over a network.

Although optimally a grid should run at 100%, which would require CPU utilization across nodes to be at 100%, an example is provided herein in which the CPU utilization is more realistically running at about 60%. However, it should be understood by those of skill in the art that the 60% utilization is merely one arbitrary example implementing the invention, and that other loads or utilization can be implemented and practiced in accordance with the invention.

Figure 1:
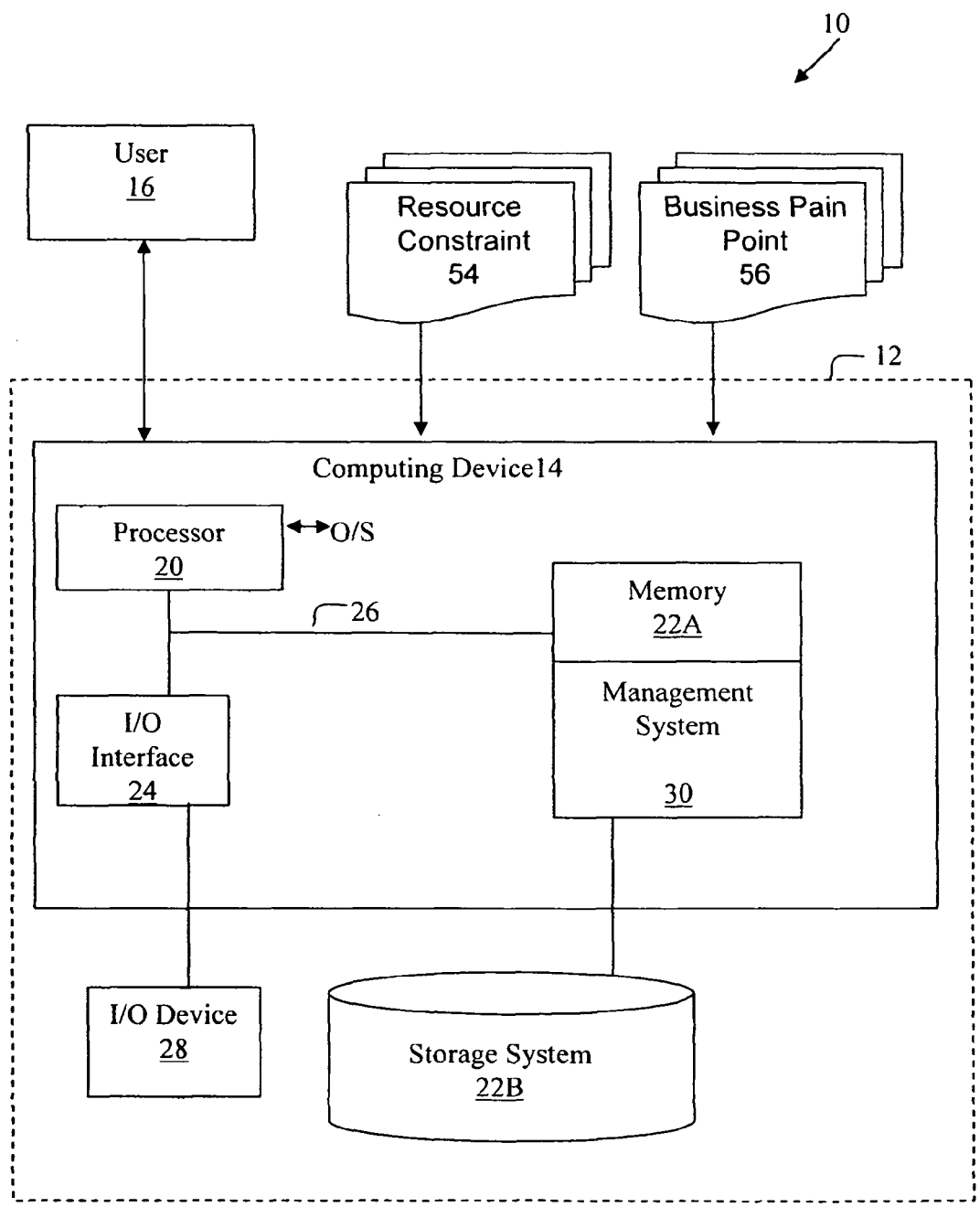
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform load balancing to optimize CPU utilization, network traffic, etc. in accordance with the invention, e.g., process described herein. The computing device 14 includes a processor 20, a memory 22A, an input/output (I/O) interface 24, and a bus 26. Further, the computing device 14 is in communication with an external I/O device/resource 28 and a storage system 22B.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. As discussed herein, the management system 30 enables the computer infrastructure 12 to provide load balancing.

In embodiments, the invention provides a business method that performs the process steps of the invention on a subscription, advertising, and/or fee basis. That is, a service provider, such as a Solution Integrator, could offer to perform the processes described herein. In this case, the service provider can create, maintain, deploy and/or support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
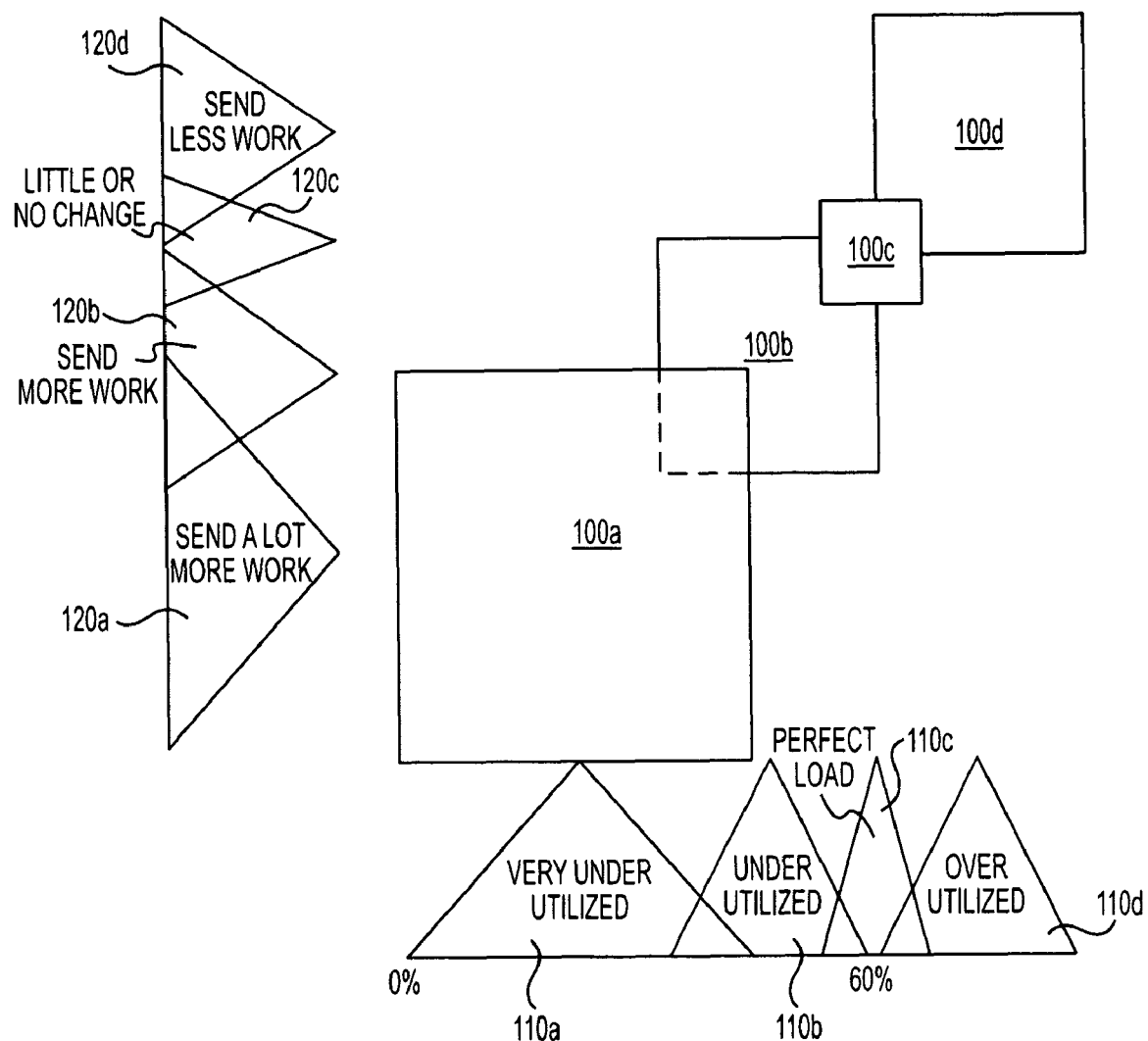
FIG. 2 is a graphical representation of a fuzzy logic rule set and corresponding outputs in accordance with the invention.

FIG. 2 is a graphical representation of a fuzzy logic rule set and corresponding outputs in accordance with the invention. This graphical representation is used to discuss the inventive concepts herein and is not meant to be a limiting feature of the present invention. In an embodiment, the fuzzy logic receives measurements as input, applies human based "if-then" rules combined with non-fuzzy rules, averages the output and produces a crisp result set. More particularly, a fuzzy set is almost any condition for which there are words and where the condition can be given a value between 0 and 1. In embodiments, the sets of rules, as discussed in greater detail below, are not defined at a precise point, but represent overlapping ranges (hedges) that determine a certain state of the load.

The rule set of FIG. 2 is defined by membership rectangles $100a$-$100d$ formed by the base of input triangles $111a$-$111d$ and the base of output triangles $120a$-$120d$. The degree of membership is the placement in the transition from 0 to 1 of the conditions within the fuzzy set. In the example provided in FIG. 2, four input triangles $110a$-$110d$ and four output triangles $120a$-$120d$ define the rule sets (input and output values); however, it should be understood that this is merely one example implementing the fuzzy logic of the present invention. To this end, the invention contemplates more or less input and output values, all depending on the particular implementation and rule sets defined by the user (which may be a service provider or other third party).

Still referring to FIG. 2, it should be understood that the graphical representation of FIG. 2 is one of many different types of graphical representations of the fuzzy logic rule set which can be implemented with the invention. For example, other shapes such as rectangles may equally be implemented by the invention. Also, although the y-axis of the graphical representation of FIG. 2 denotes the output and the x-axis denotes the input, these representations can be reversed. Additionally, as discussed briefly above, the input triangles 110a-110d overlap with one another and, similarly, the output triangles 120a-120d overlap with one another. The overlap of the input and the output is considered a "hedge", which is self-defined by the user. In embodiments, determining hedges (e.g., start points and end points for input) can vary from system to system; therefore determining hedges should be applied during development. Moreover, just as the input and outputs overlap, the membership rectangles 100a-100d also overlap with one another.

In the non-limiting illustration of FIG. 2, the user defines a perfect load at 60%. That is, in the system and method of the invention, the controlling methods of fuzzy logic adjust workload sent to the processor by the grid client through a predetermined optimal threshold of 60% CPU utilization. This same or similar control can be applied to traffic over a network, as should be understood by those of skill in the art after reading the present disclosure. By throttling the work sent to the grid processes, the system and method of the invention constantly strives to achieve a constant 60% utilization (i.e., optimum utilization) allowing the grid application to maximize cycles while minimizing impact to the user. In the examples provided, the system and method of the invention assumes a common packet or job size for every submission.

In an example of implementation, the "if-then" rule set may be defined by the user (which may be a service provider or other third party). In the example of FIG. 2, the "if" portion of the rule set may be defined as:

Very under utilized 110a;
Under utilized 110b;
Perfect load 110c; and
Overloaded 110d.

An output action or "then" portion of the descriptor may include, respectively, for example, Send a lot more work 120a;
Send more work 120b;
No change 120c; and
Send less work 120d.

More simplistically said, in embodiments, the linguistic rules using the above example would comprise the following rule sets:

(i) Rule 1: If the processor is very under utilized, send a lot of work;
(ii) Rule 2: If the processor is underutilized, send more work;
(iii) Rule 3: If the processor is under perfect load, do nothing; and
(iv) Rule 4: If the processor is overloaded, send less work.

In embodiments, these rule sets may be stored in a database, flat file, server, etc. and the processes for using the rule set may be implemented on a hardware and/or software component. Also, from a client perspective, work may be jobs, job packets, CPU cycles, bandwidth, etc.

The user can define inputs using some range of numerical values, as the following example shows: (i) very under utilized 0-40%; (ii) under utilized: 30-55%; (iii) perfect utilization 50-65%; and (iv) over utilized 61%-100%. Additionally, the output hedges can also be defined as the follow example shows: (i) send a lot more work schedule: 60-100 packets; (ii) send more work schedule: 30-70 packets; (iii) no change to schedule: 15 to 40 packets; and (iv) send less work schedule: zero to 20 packets.

It should be understood that the above rules set and defined values are merely one illustrative example of implementing the invention. Other rule sets and definitions equally apply, depending on the particular application. For example, in the case of network traffic, the rule sets may be defined, linguistically and numerically, as packets of information sent over a network, baud rates, etc.

Figure 3:
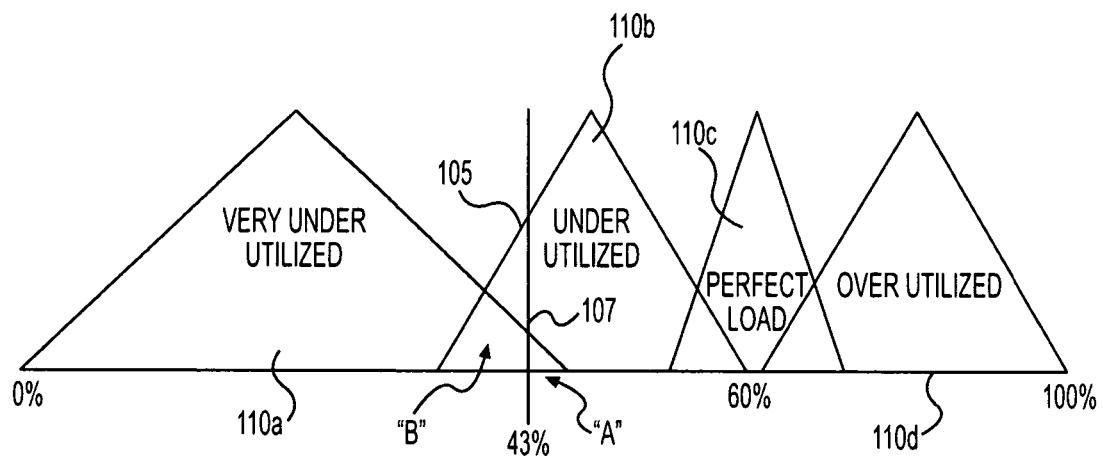
FIG. 3 shows an example of a CPU utilization implemented in accordance with the invention.

As a further discussion of the principles of the invention, FIG. 3 shows an example of a CPU utilization of 43%. In this illustrative example, the line perpendicular to the x axis is drawn at 43% of CPU utilization, which intersects the two triangles 110a and 110b thus demonstrating membership in both of the triangles 110a and 110b. Likewise, the corresponding outputs demonstrate membership of the 43% of CPU utilization in the triangles 120a and 120b. The perpendicular line to the x-axis intersects the triangles 110a and 110b at intersection points 105 and 107, forming two triangles "A" and "B". The heights of the two triangles "A" and "B" will be used to adjust the load of the processes or other functions such as, for example, network traffic.

In the graphical illustration of FIG. 3, it is possible to determine the height of the intersection points 105 and 107 (and thus the triangles "A" and "B") by taking advantage of the ratio of the sides of congruent triangles. These heights will be later used to determine the load balance. To determine the height of the intersection points 105 and 107, a determination is made as to the height of the triangles that are bisected by the line perpendicular to the x-axis. In the present case the height of the triangles 110a and 110b is known to be 1. Since the triangles 110a and 110b are equilateral triangles (similar to the triangles 110c and 110d), a midpoint through the triangles 110a and 110b can be drawn, forming two right triangles "A1" and "A2" for triangle 110a and two right triangles "B1" and "B2" for triangle 100b (see, FIG. 4). Triangles "A" and "A1" are congruent triangles and triangles "B" and "B1" are congruent triangles.

Figure 4:
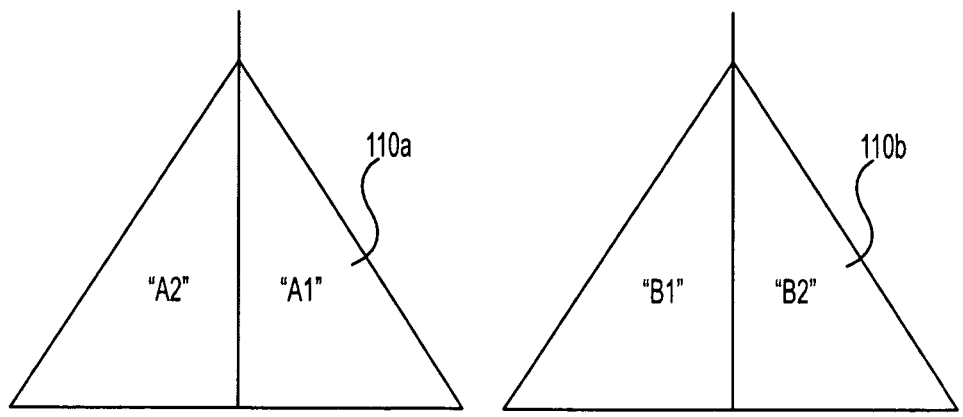
FIG. 4 shows a graphical representation of a process step implemented in accordance with the invention.

In one example, using trigonometric functions, it is possible to determine the base of each of the formed right triangles "A1", "A2", "B1" and "B2" of FIG. 4. For example, by placing a midpoint intersecting line, it is possible to determine the base of the formed right triangle using the following trigonometric formula.

$$\tan\theta = \frac{opp}{adj} = \frac{y}{x}$$

where $\theta$ is 45° and $Y=1$.

Alternatively, since the length of the base can be user defined, the base of the bisected triangles of FIG. 4 can be calculated by dividing the base in half, e.g., base/2. By way of illustration, using the above rule set:

(i) the base of the very under utilized triangle 110a is 40 units (defined by the user as 0-40%);

(ii) the base of the under utilized triangle 110b is 25 units (defined by the user as 30-55%);

(iii) the base of the perfect utilization triangle is 15 units (defined by the user as 50-65%); and (iv) the base of the over utilized triangle is 39 units (defined by the user as 61%-100%).

The base of the bisected triangles of FIG. 4, for example, would then be calculated by dividing, in half, 40 units and 25 units for triangle 110a and triangle 110b, respectively.

Knowing the length of the base and height of the triangles "A1", and "B1" (FIG. 4), the dimensions of the triangles "A" and "B" formed by the 43% of CPU utilization of FIG. 3 can be found using ratios between the congruent triangles "A" and "A1" and "B" and "B1". In this example, the height of the triangle "B" is 0.7 and the height of the triangle "A" is 0.3. This same type of logic can be implemented for other values, as should be recognized by those of skill in the art.

Figure 5:
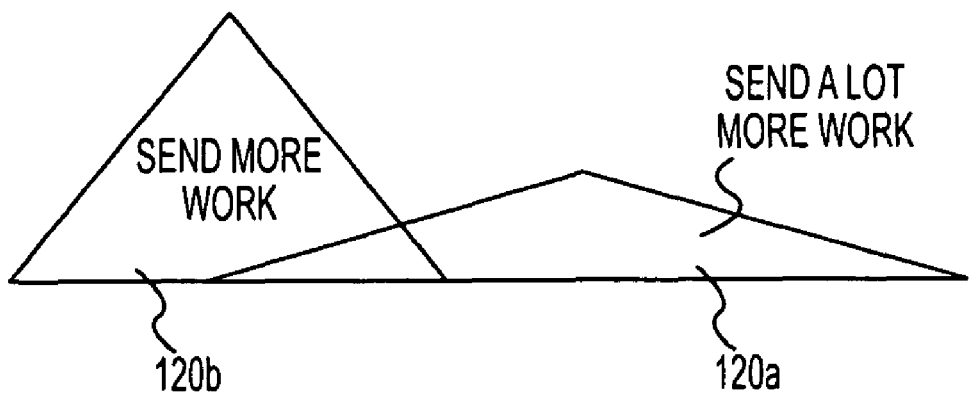
FIG. 5 shows a graphical representation of an output resulting from implementation of the invention.

Referring to FIG. 5, the height of the output triangles 120a and 120b is the result of the membership in the input variables. For example, using the 43% intersection line of FIG. 3, the resultant height of the triangle "B" is 0.7 and the resultant height of the triangle "A" is 0.3. Accordingly, the height of the corresponding output, e.g., send more work triangle 120b, would be set to 0.7 and the height of the remaining membership output, e.g., send a lot more work triangle 120a, would be set at 0.3. These "effect" triangles of FIG. 5 will be used to determine controller output; that is the needed work to send in order to optimize the CPU utilization, network traffic, etc.

Figure 6:
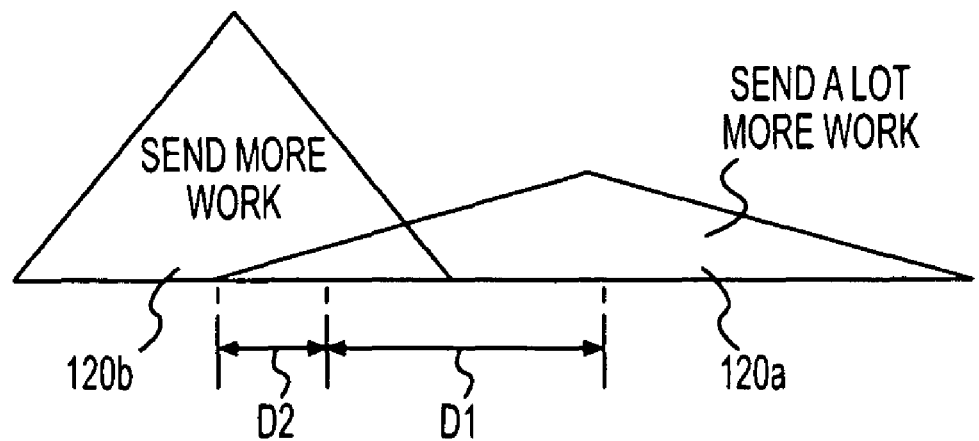
FIG. 6 graphically shows a calculation process implemented in accordance with the invention.

To determine the adjusted output, the system and method finds the point that balances the areas of the two triangles 120a and 120b of FIG. 5 thus representing a weight, i.e., at what point does the weight balance. For example, the output, as graphically seen in FIG. 6, is determined by calculating the point (output) at which a fulcrum would balance the two triangles 120a and 120b, i.e., when areas on the opposing sides of the fulcrum become equal. By way of example, the area of each triangle 120a and 120b is calculated by ½ base× height. D1 is the distance from the midpoint of the base of the triangle 120b (e.g., send more work) to the fulcrum and D2 is the distance from midpoint of the base of the triangle 120a (e.g., send a lot more work) to the fulcrum. The area of the triangle 120b times D1 equals the area of the triangle 120a times D2. Since it is known that D1+D2 is equal to the distance between the two midpoints (known factor) it is possible to solve for D1 using substitution.

Once the point is found which balances the areas of the triangles, it is possible to associate that point with a value (e.g., numerical value or weight). The value is then added to or subtracted from the current utilization value to provide the load balancing adjustment. That is, the output of these calculations is the necessary adjustment required for optimizing load.

In essence, the use of the imprecisely defined set of variables is used to obtain a "crisp", well-defined output. In turn, the well-defined output is implemented to precisely control and balance loads in the environment. So, in the example discussed herein, the well-defined output would be used to add more packets to the processes in order to increase the already known utilization rate of 43% to a 60% utilization thus optimizing performance.

Figure 7:
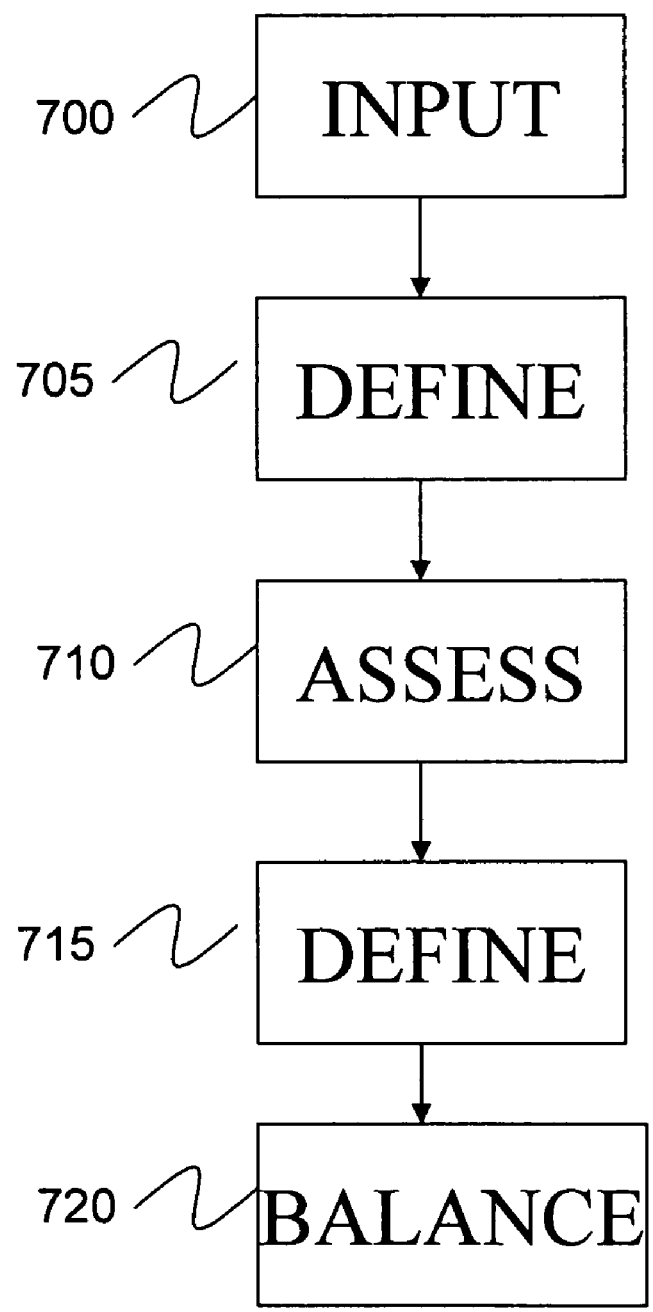
FIG. 7 is a flow chart of steps for implementing aspects of the invention.

FIG. 7 is a flow diagram implementing steps of the invention which may be implemented in the environment of FIG. 1. FIG. 7 may equally represent a high-level block diagram of the invention. The steps of FIG. 7 may be implemented and executed from either a server, in a client server relationship, or they may run on a user workstation with operative information conveyed to the user workstation to balance workload. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Referring back to FIG. 7, at step 700, the processes of the invention determine the inputs (e.g., utilization). At step 705, the cause and effect relations (e.g., if-then or input and output relations) are defined. These relations may be defined by the user for a user defined scenario such as, for example, CPU processes, network traffic, etc. The steps of 700 and 705 may be reversed or performed simultaneously. At step 710, an assessment is made for each relationship separately to produce a crisp output for each relationship. In this step, for example, the processes of the invention determine which cause and effect relations between input variables and output variables belong in a membership with the inputs (e.g., utilization). At step 715, the results of the relationships are merged (define) in a weighted average. This may include, for example, calculating a weight (also referred to as a balancing factor) for the cause and effect relations having membership with the utilization inputs. At step 720, the load is balanced using the results obtained in step 715.

The processes described herein may take place on a continuous basis at predefined intervals. For example, the processed described above may cycle through polling events as defined by the user, at discrete cycles of the CPU. Also, since the above calculations are not process intensive, it is possible to provide the above calculations without any significant drain on resources.

In environments where the grid may use resources bound to desk side workers i.e. workstations, the user may take priority over the grid applications. In some cases, the client can switch to a low or high priority mode depending on the job or task. The low priority mode is induced to make little impact on the user while processing work on the packets the client has received. Although the priority mechanism is effective in presenting the client priority, the throttle mechanism leaves spent CPU cycles that could be used to process information. The optimal situation is to use enough cycles that information is still processed for the grid, but it demonstrates no noticeable impact on the user.

While the invention has been described in terms of embodiments, those skilled in the art will recognize that the invention can be practiced with modifications and in the spirit and scope of the appended claims.

What is claimed is:

1. A method, comprising:
    defining cause and effect relations associated with input variables and output variables;
    assessing a current utilization using a processor of a management system;

determining which cause and effect relations are associated with the current utilization using the processor of the management system;

calculating a weighted balancing factor for the cause and effect relations having membership with the utilization using the processor of the management system; and balancing a load using the weighted balancing factor using the processor of the management system.

2. The method of claim 1, wherein the cause and effect relations are user defined.

3. The method of claim 1, wherein the cause and effect relations are linguistic statements.

4. The method of claim 3, wherein the cause and effect relations are defined by numerical values associated with the linguistic statements.

5. The method of claim 1, wherein the balancing is performed at predefined intervals.

6. The method of claim 1, wherein the balancing is overridden based on priority of a job.

7. The method of claim 1, wherein the steps of claim 1 are provided by a service provider.

8. The method of claim 1, wherein a service provider at least one of creates, maintains and supports a computer infrastructure that performs the steps of claim 1.

9. The method of claim 1, wherein the steps of claim 1 are provided on a subscription, advertising, and/or fee basis.

10. The method of claim 1, wherein at least the defining step is implemented using fuzzy logic.

11. The method of claim 10, wherein the fuzzy logic is implemented on computer elements using at least one of processor feedback, packet profiling, and I/O monitoring.

12. The method of claim 10, wherein the fuzzy logic uses information that is not precisely defined and creates a definable precise value for the weighted balancing factor.

13. The method of claim 1, wherein the steps of claim 1 are configured to balance network traffic.

14. The method of claim 1, wherein the cause and effect relations are given a value between 0 and 1.

15. The method of claim 1, wherein the cause and effect relations are if-then rules.

16. The method of claim 15, wherein the if-then rules have ranges.

17. The method of claim 1, wherein the cause and effect relations are defined geometrically using shapes.

18. The method of claim 17, wherein the shapes are overlapping equilateral triangles representative of the input variables and output variables.

19. The method of claim 18, wherein the overlapping is a hedge defined as start points and end points.

20. The method of claim 19, further comprising determining an intersection between at least two of the equilateral triangles associated with an output defining the current utilization.

21. The method of claim 20, wherein the intersection forms two additional triangles used in the calculating of the weighted balancing factor.

22. The method of claim 21, further comprising calculating a height of the two additional triangles by bisecting at least two of the equilateral triangles to form congruent triangles with the two additional triangles and using, in part, ratios between the congruent triangles.

23. The method of claim 22, wherein the height of the two additional triangles is used to adjust a height of overlapping output triangles which are in the membership with the bisected at least two of the equilateral triangles.

24. The method of claim 23, wherein the weighted balancing factor is calculated by finding a point that balances areas of the adjusted overlapping output triangles.

25. The method of claim 24, wherein the point is associated with a value which is added to or subtracted from the current utilization to provide a precise value for the weighted balancing factor.

* * * * *